United States Patent [19]

Hiramitsu et al.

[11] Patent Number: 4,759,235
[45] Date of Patent: * Jul. 26, 1988

[54] PLANETARY GEAR ASSEMBLING STRUCTURE FOR STEERING WHEELS

[75] Inventors: Tetsushi Hiramitsu, Kasugai; Hiroshi Sugita, Ichinomiya; Satoshi Ono, Inazawa; Zenzaburo Murase, Konan, all of Japan

[73] Assignee: Toyoda Gosei Co., Ltd., Nishikasugai, Japan

[ * ] Notice: The portion of the term of this patent subsequent to Dec. 31, 2002 has been disclaimed.

[21] Appl. No.: 882,015

[22] Filed: Jul. 3, 1986

Related U.S. Application Data

[63] Continuation of Ser. No. 562,538, Dec. 19, 1983, abandoned.

[30] Foreign Application Priority Data

Dec. 18, 1982 [JP] Japan ................. 57-222719
Jun. 21, 1986 [JP] Japan ................. 61-145415

[51] Int. Cl.4 .............................................. F16H 1/28
[52] U.S. Cl. ........................................ 74/802; 74/485; 74/484 R
[58] Field of Search .............. 74/484 R, 485, 490, 74/494, 802; 384/428, 539; 411/539; 24/459

[56] References Cited

U.S. PATENT DOCUMENTS

| | | | |
|---|---|---|---|
| 440,717 | 11/1890 | Mower | 74/802 X |
| 760,914 | 5/1904 | Newberry | 411/539 |
| 1,133,634 | 3/1915 | Gushurst | 384/428 |
| 2,136,155 | 11/1938 | Spicacci | 384/539 |
| 2,382,846 | 8/1945 | Barber | 74/802 |
| 2,699,034 | 1/1955 | Maire | 74/802 X |
| 2,943,510 | 7/1960 | Bohnhoff et al. | 74/802 X |
| 2,985,030 | 5/1961 | Schultz | 74/802 X |
| 3,203,390 | 8/1965 | Boda | 74/802 X |
| 3,684,324 | 8/1972 | Sterner | 384/428 X |
| 3,757,031 | 9/1973 | Izraeli | 24/459 X |
| 3,760,811 | 9/1973 | Andrew | 24/459 X |
| 3,856,246 | 12/1974 | Sinko | 24/459 X |
| 4,118,838 | 10/1978 | Schiefer et al. | 24/459 X |
| 4,405,161 | 9/1983 | Young et al. | 24/459 X |
| 4,485,371 | 11/1984 | Yamada et al. | 74/484 R X |
| 4,561,324 | 12/1985 | Hiramitsu et al. | 74/484 R |

FOREIGN PATENT DOCUMENTS

| | | | |
|---|---|---|---|
| 221618 | 6/1962 | Austria | 24/459 |
| 49-17167 | 4/1974 | Japan | |
| 1350571 | 4/1974 | United Kingdom | 24/459 |

*Primary Examiner*—Leslie A. Braun
*Assistant Examiner*—James W. Innskeep
*Attorney, Agent, or Firm*—Cushman, Darby & Cushman

[57] ABSTRACT

Herein disclosed is a steering wheel structure which has a stationary pad. On a steering shaft, there are mounted a boss plate of the steering wheel and column-side and pad-side sun gears. The boss plate is formed with at least one mounting recess which is opened to the outside. In this mounting recess, there is rotatably mounted through an intermediate member at least one planetary shaft which has column-side and pad-side planetary gears at its two ends. Upon assembly, the two planetary gears are brought into respectively meshing engagements with the two sun gears from the radially outer sides of the same.

8 Claims, 4 Drawing Sheets

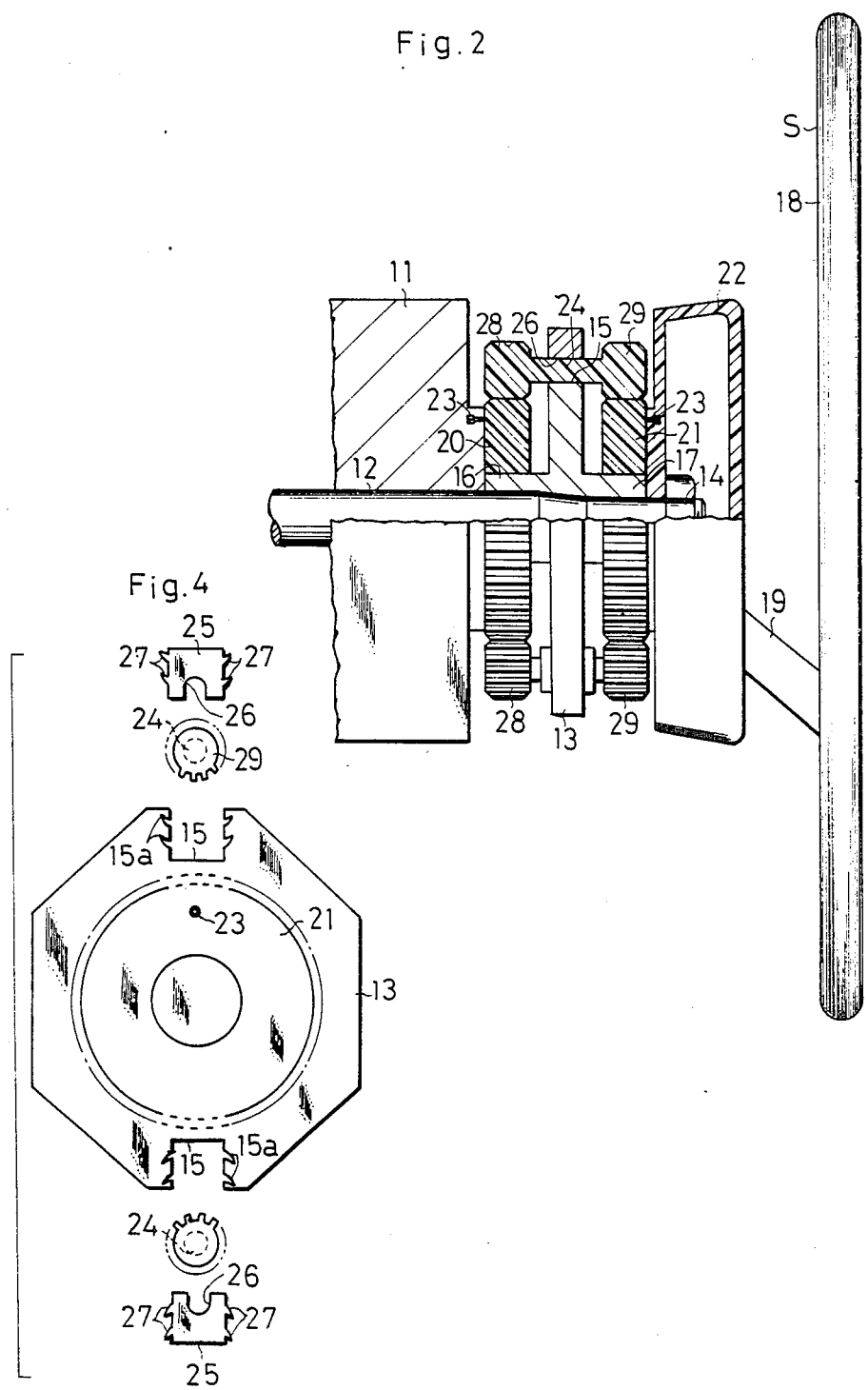

PLANETARY GEAR ASSEMBLING STRUCTURE FOR STEERING WHEELS

This is a continuation of application Ser. No. 562,538, filed Dec. 19, 1983, which was abandoned upon the filing hereof.

BACKGROUND OF THE INVENTION

1. Field of the Invention

The present invention relates to an assembling structure for assembling planetary gears with sun gears in a steering wheel of stationary pad type having the planetary gears.

2. Description of the Prior Art

In case planetary gears are to be assembled with sun gears in a steering mechanism equipped with a planetary gear mechanism, there can be conceived such a method as is shown in FIG. 1. According to this method, a column-side sun gear 2 is fixed on a column 1, whereas a plurality of column-side and pad-side planetary gears 4 and 5 are assembled with the boss plate 3 of a steering wheel S. In this state, the boss plate 3 is moved to bring its column-side planetary gear 4 into meshing engagement with the aforementioned column-side sun gear 2. After that, a pad-side sun gear 7 bearing a pad 6 is brought into meshing engagement with the aforementioned pad-side planetary gear 5.

In case, however, the planetary gears 4 and 5 are assembled with the sun gears 2 and 7 by the aforementioned method, all of the two planetary gears 4 and 5 and the pad-side sun gear 7 have to be moved in their axial directions. As a result, the assembly cannot be ensured with ease unless considerable back-lash is reserved between the sun gear 2 and the planetary gear 4 at the column side and between the sun gear 7 and the planetary gear 5 at the pad side. If the back-lash is excessive, there arises another problem that the gears and accordingly the pad 6 highly chatter. These problems become prominent especially in case the aforementioned sun gears 2 and 7 and planetary gears 4 and 5 are helical ones. In the case of the helical gears, more specifically, the assembly becomes so difficult as it were impossible, if the back-lash is reduced.

SUMMARY OF THE INVENTION

It is an object of the present invention to provide a planetary gear assembling structure for a steering wheel, in which the back-lash between the sun gears and the planetary gears can be reduced to prevent the pad from chattering and to improve the assembly of said gears.

Another object of the present invention is to provide a planetary gear assembling structure for a steering wheel, in which the sun gears and the planetary gears can be brought into meshing engagements with ease but without any increase in their back-lash even if they are not spur ones but helical or double-helical ones.

Other objects of the present invention will become apparent from the following embodiments thereof and will be defined in the appended claims. Moreover, numerous advantages left untouched in the specification will be remembered by those skilled in the art if the present invention is practiced.

BRIEF DESCRIPTION OF THE DRAWINGS

FIG. 2 is a partially cut-away front view showing a steering wheel in which the planetary gear assembling structure of the present invention is embodied;

FIG. 4 is a broken side view showing the mounting structure for mounting the planetary gears on the boss plate;

DESCRIPTION OF THE PREFERRED EMBODIMENTS

Figure 1:
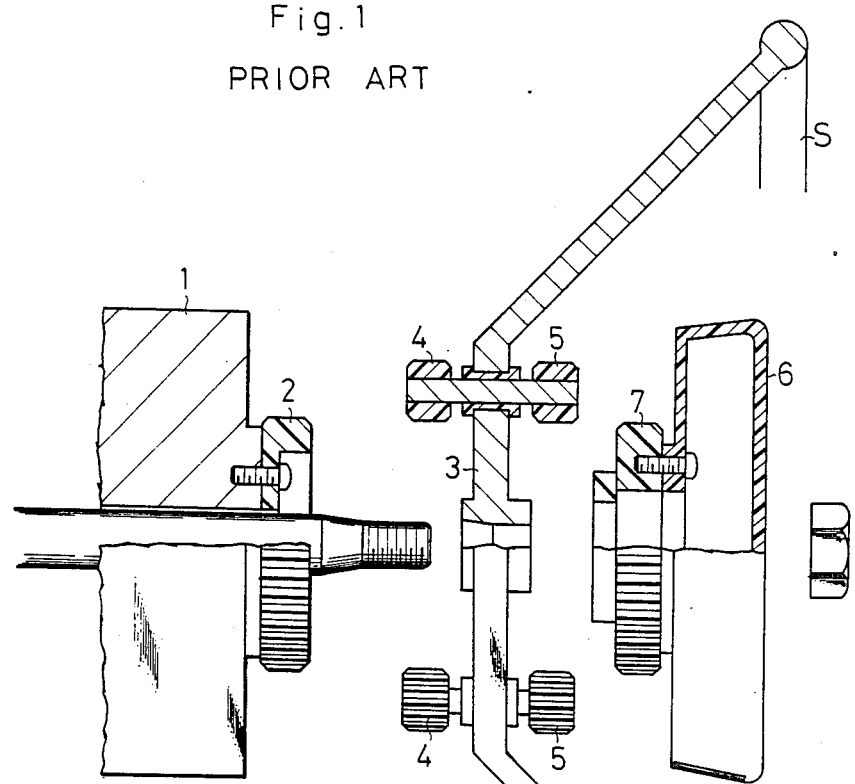
FIG. 1 is a partially cut-away front view showing the planetary gear assembling structure for a steering wheel according to the prior art.

The present invention will be described in the following in connection with the embodiments thereof with reference to the accompanying drawings. Reference numeral 11 indicates a column of an automobile, and numeral 12 indicates a steering shaft which extends through the inside of the column 11. To the outer end portion of the steering shaft 12, there is fixed a boss plate 13 of a steering wheel S by means of a nut 14. That boss plate 13 is formed, as shown in FIG. 4, into a generally hexagonal shape and at both opposite edge portions with mounting recesses 15 which are opened to the outside. Indicated at reference numeral 15a are a plurality of stopper notches which are formed in both the side walls of each of the mounting recesses 15. Indicated at numerals 16 and 17 are a pair of mounting bosses which are formed to integrally protrude from the central portion of the boss plate 13 toward the column and pad sides, respectively. The aforementioned nut 14 abuts against the pad-side boss 17. Numeral 18 indicates a ring of the steering wheel S, which is connected to the aforementioned boss plate 13 through a spoke 19.

Indicated at reference numerals 20 and 21 are column-side and pad-side sun gears which are respectively mounted on the paired mounting bosses 16 and 17 of the aforementioned boss plate 13. The respective sun gears 20 and 21 are made rotatable relative to the corresponding bosses 16 and 17. Incidentally, those two sun gears 20 and 21 are made to have an equal number of teeth. Numeral 22 indicates a pad which is fixed on the steering shaft 12 at the outside of the aforementioned pad-side sun gear 21 by means of the aforementioned nut 14 and which is enabled to mount various switches and indicators thereon. Indicated at numeral 23 are a pair of retaining pins which are anchored in the respective sun gears 20 and 21 in a manner to protrude toward the column 11 and the pad 22, respectively. Those retaining pins 23 are fitted in the column 11 and the pad 22, respectively, to block the rotations of the sun gear 20 relative to the column 11 and of the sun gear 21 relative to the pad 22.

Indicated at reference numeral 24 are a pair of planetary shafts which are rotatably mounted in both the mounting recesses 15 of the aforementioned boss plate 13. Both the planetary shafts 15 are fitted in the mounting recesses 15 through intermediate members 25. These intermediate members 25 are formed into such a U-shaped block that their insides provide open grooves 26 opened at the bottom sides of the mounting recesses 15 so as to receive the planetary shafts and that both their outer sides are formed with a plurality of stopper projections 27.

Each planetary shaft 24 is rotatably borne in the open groove 26 of the intermediate member 25. On the other hand, each intermediate member 25 is prevented from coming out, while it is being fitted in the mounting recess 15, by the stopper projections 27 being retained in the stopper notches 15a.

Indicated at reference numerals 28 and 29 are column-side and pad-side planetary gears which are integrally mounted on both the ends of each planetary shaft 24. Those planetary gears 28 and 29 are in respective meshing engagements with the aforementioned column-side and pad-side sun gears 20 and 21. Incidentally, the two planetary gears 28 and 29 are made to have an equal number of teeth.

Both the planetary gears 28 and 29 are adapted to revolve around the outer circumferences of the two sun gears 20 and 21, while freely rotating, in accordance with the rotations of the boss plate 13 actuated by the steering operation.

Incidentally, the column-side sun gear 20 is made irrotatable when the steering wheel S is turned in that way. At the same time, the column-side sun gear 20 and the pad-side sun gear 21 have the equal tooth number, and the column-side and pad-side planetary gears 28 and 29 have the equal tooth number. As a result, the pad-side sun gear 21 is held in such a stationary state that the pad 22 fixed to that sun gear 21 is always held in the stationary state relative to the column 11 irrespective of the steering operation.

Figure 3:
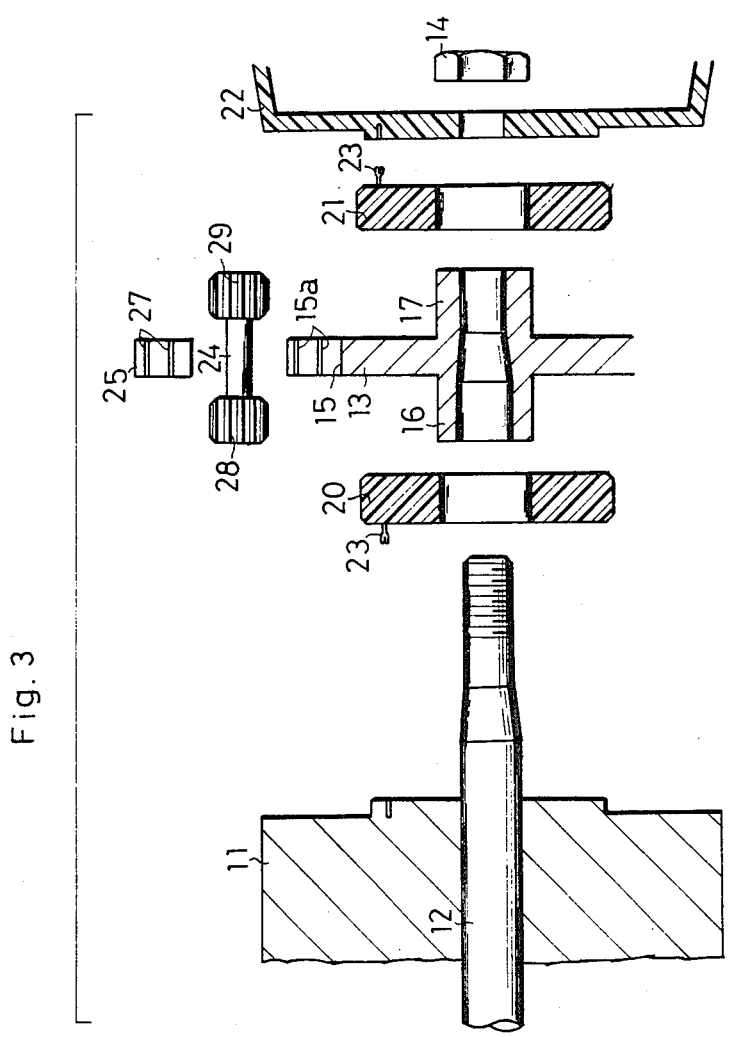
FIG. 3 is a broken front view showing the same.

Here, in the steering wheel having the construction thus far described, in case the planetary gears are to be assembled, the column-side and pad-side sun gears 20 and 21 are first mounted on the mounting bosses 16 and 17 of the boss plate 13 of the steering wheel S, as shown in FIG. 3, and are then mounted, as they are, together with the boss plate 13 on the steering shaft 12. At this time, moreover, the retaining pin 23 of the column-side sun gear 20 is driven into the column 11. Then, the pad 22 is attached to the pad-side mounting boss 17 of the boss plate 13, and the nut 14 is fastened onto the outer end of the steering shaft 12. When the pad 22 is to be attached, on the other hand, the retaining pin 23 of the pad-side sun gear 21 is driven into the pad 22. Then, the nut 14 is fastened to fix the boss plate 13, the paired sun gears 20 and 21 and the pad 22 at one time on the column 11. At this time, moreover, the column-side sun gear 20 is irrotatable relative to the column 11 so that the pad 22 is irrotatably fixed to the pad-side sun gear 21.

Figure 5:
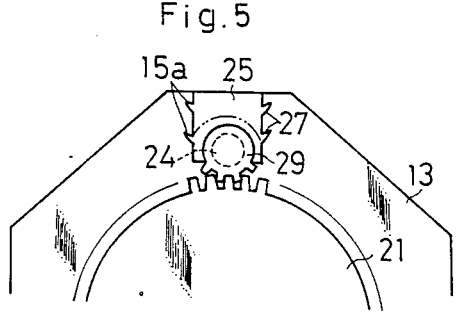
FIG. 5 is an enlarged side view showing a portion of the mounting structure of FIG. 4.

When the boss plate 13, the sun gear 21 and so on are assembled in the aforementioned manner on the steering shaft 12, then the paired planetary shafts 24 are fitted in the upper and lower mounting recesses 15 of the boss plate 13, and the planetary gears 28 and 29 at the two ends of the same shaft 24 are simultaneously brought into meshing engagements with the two sun gears 20 and 21. When the planetary shafts 24 are to be mounted in the mounting recesses 15, the intermediate members 25 are fitted in the mounting recesses 15, as shown in FIG. 5, with the planetary shafts 24 being fitted in the open grooves 26 of the respective intermediate members 25. Then, the intermediate members 25 have their stopper projections 27 engaging with the stopper notches 15a so that they are fixed and prevented from coming out of the mounting recesses 15 while preventing the planetary shafts 24 from coming out.

Figure 8:
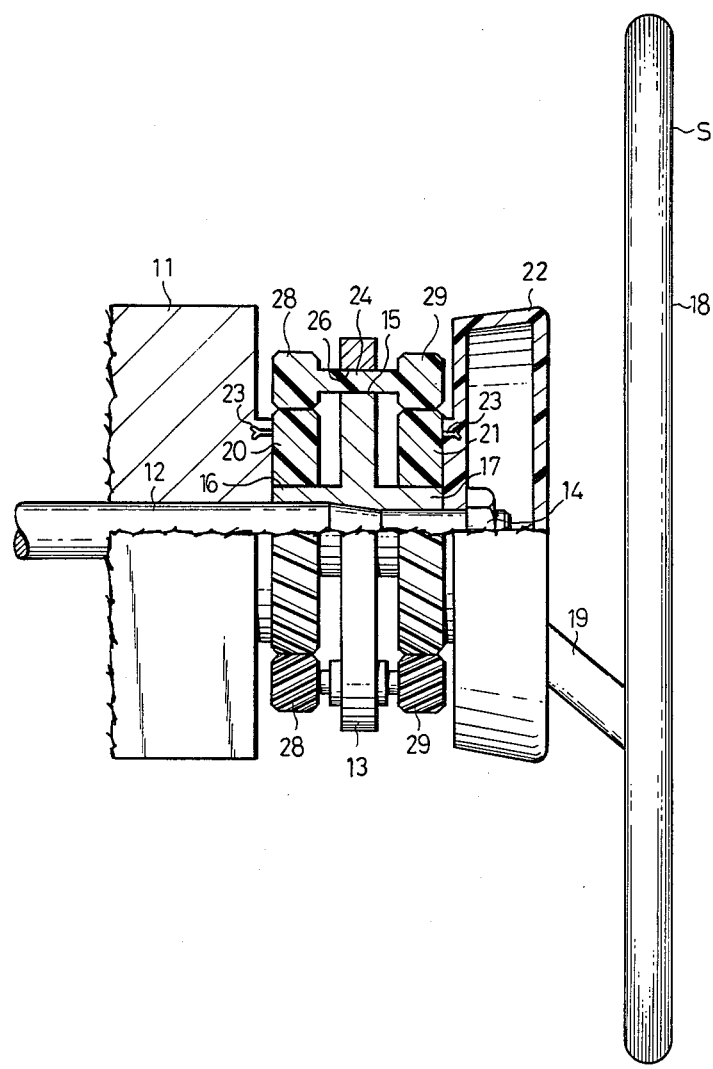
FIG. 8 is a view corresponding to FIG. 2 but wherein the gears are helical.

Since the planetary gears 28 and 29 are made to mesh the sun gears 20 and 21 in the aforementioned manner, it is sufficient to bring the respective teeth of those planetary gears 28 and 29 into meshing engagements with the corresponding teeth of the sun gears 20 and 21 from the radially outsides. As a result, it is possible to assemble the planetary gears 28 and 29 with ease and to sufficiently reduce the back-lash between those corresponding planetary and sun gears 28, 29, 20 and 21. Moreover, those gears 28, 29, 20 and 21 can easily come into meshing engagements with each other without any increase in the back-lash even in case they are helical or double-helical gear, as shown in FIG. 8.

If the back-lash is reduced, the gears less chatter so that the chattering of the pad 22 can be depressed as much as possible.

If the paired planetary gears 28 and 29 are made integral with the planetary shafts 24 as in the foregoing embodiment, the teeth of the two planetary gears 28 and 29 do not come out of phase, while they are being used, so that no chattering is caused by that phase difference.

Figure 6A:
FIGS. 6A and 6B are side views showing other examples of an intermediate member.
Figure 6B:
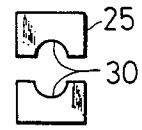

On the other hand, the intermediate members 25 are formed into the U-shaped blocks in the foregoing embodiment but may be formed into such a rectangular shape as is formed at its center with a through hole 30 for receiving the corresponding planetary shaft 24, as shown in FIG. 6A. In an alternative, as shown in FIG. 6B, the intermediate member 25 may be divided into two upper and lower halves.

Figure 7:
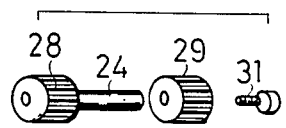
FIG. 7 is a perspective view showing planetary gears of the type which are made separately of a planetary shaft.

Incidentally, in case the intermediate member 25 is formed into the integral piece, as shown in FIG. 6A, at least one of the corresponding planetary gears 28 and 29 to be used is made separate from the corresponding planetary shaft 24, as shown in FIG. 7. The separate planetary gear 28 or 29 is fixed to the end portion of the planetary shaft 24 by means of a screw 31 after the planetary shaft 24 has been fitted in the hole 30 of the intermediate member 25.

Incidentally, it is naturally possible to use the planetary gears 28 and 29 of the type shown in FIG. 7 in combination with not only the intermediate member 25 of FIG. 6A but also the intermediate member 25 shown in FIGS. 4, 5 and 6.

As has been described hereinbefore, the present invention can enjoy effects that the chattering of the pad can be prevented by reducing the back-lash between the sun gears and the planetary gears, and that the mutual assembly of those gears can be improved.

Since a wide variety of modifications can be apparently constructed without departing from the spirit and scope of the present invention, the present invention should not be limited to the specified embodiment except it is defined by the appended claims.

What is claimed is:

1. A planetary gear assembling structure for a steering wheel of a vehicle having a steering column, said wheel having a boss plate, comprising:
a steering shaft rotatable in said column and rotatably mounting thereon a pad, said boss plate being mounted on said shaft between the end of said column and said pad;
a first sun gear between said end of said column and said boss plate and a second sun gear between said boss plate and said pad, said boss plate being made rotatable integrally with said steering shaft, and said sun gears being made rotatable relative to said steering shaft;

at least one mounting recess formed in said boss plate such that it is opened toward the outside of the same;

at least one planetary shaft mounted rotatably in said mounting recess and having at both its ends planetary gears respectively meshing with said sun gears;

an intermediate member interposed between said planetary shaft and said mounting recess so that said planetary gears can be brought into respectively meshing engagements with said sun gears from the radially outer sides thereof; and a stopper means for fixing said intermediate member in said mounting recess comprising:

a plurality of stopper projections formed on the outer sides of side intermediate member; and a corresponding number of stopper notches formed in the inner sides of said mounting recess such that they can engage with the corresponding stopper projections.

2. A planetary gear assembling structure according to claim 1, comprising two mounting recesses, which are formed in a pair in two portions of said boss plate on opposite sides of the steering shaft, and two corresponding intermediate members.

3. A planetary gear assembling structure according to claim 2, wherein each of said intermediate members has a bearing portion for bearing the corresponding planetary shaft in a freely rotatable manner.

4. A planetary gear assembling structure according to claim 3, wherein said bearing portion has an open groove recessed in the corresponding intermediate member so that the corresponding mounting recess may have its bottom opened.

5. A planetary gear assembling structure according to claim 3, wherein said bearing portion is a through hole which is formed in the central portion of the corresponding intermediate member.

6. A planetary gear assembling structure according to claim 3, wherein each of said intermediate members is divided into an upper and lower half, and wherein said bearing portion is a hole which is formed in the boundary between the two halves of the corresponding intermediate member.

7. A planetary gear assembling structure according to claim 1, wherein said boss plate is formed at its central portion with a pair of mounting bosses which protrude on said steering shaft toward the column and the pad, wherein said sun gears are respectively mounted on said mounting bosses rotatably relative to the same, wherein said first sun gear being irrotatably fixed on said column, and wherein the pad is irrotatably mounted on said second sun gear.

8. A planetary gear assembling structure according to claim 6, wherein said sun gears and planetary gears are double helical gears.

* * * * *